United States Patent [19]
Yang

[11] Patent Number: 6,101,161
[45] Date of Patent: Aug. 8, 2000

[54] VOLUME HOLOGRAPHIC DATA STORAGE SYSTEM INCORPORATING THEREIN A CYLINDRICAL STORAGE MEDIUM

[75] Inventor: Yun-Won Yang, Seoul, Rep. of Korea

[73] Assignee: Daewoo Electronics Co., Ltd., Seoul, Rep. of Korea

[21] Appl. No.: 09/076,659

[22] Filed: May 12, 1998

[30] Foreign Application Priority Data

May 29, 1997 [KR] Rep. of Korea ............. 97-21509
Jun. 30, 1997 [KR] Rep. of Korea ............. 97-29526
Jun. 30, 1997 [KR] Rep. of Korea ............. 97-29527

[51] Int. Cl.$^7$ ............................................. G11B 7/00
[52] U.S. Cl. ............................................. 369/103
[58] Field of Search ............................... 369/103, 109, 369/110, 112, 44.12, 44.23

[56] References Cited

U.S. PATENT DOCUMENTS 5,481,523 1/1996 Dewald ............................. 369/103
5,995,251 7/1998 Hesselink et al. .................. 369/103

*Primary Examiner*—Nabil Hindi
*Attorney, Agent, or Firm*—Anderson Kill & Olick, PC

[57] ABSTRACT

An angular-multiplexed storage system incorporates therein a cylindrical storage medium for storing multiple holograms. The angular-multiplexed storage system comprises a light source for generating a coherent light beam, a beam splitter for splitting the coherent light beam into a reference and a signal beams, a storage medium for three-dimensionally storing the multiple holograms thereinto, the storage medium being in the form of a cylinder, a pair of mirrors for directing the signal and the reference beams to the storage medium, respectively, and a stepping motor for rotating the storage medium about an axis perpendicular to a plane which includes the signal and reference beams, wherein the axis passes through a center point of the storage medium.

13 Claims, 2 Drawing Sheets

VOLUME HOLOGRAPHIC DATA STORAGE SYSTEM INCORPORATING THEREIN A CYLINDRICAL STORAGE MEDIUM

FIELD OF THE INVENTION

The present invention relates to a volume holographic data storage system; and, more particularly, to an angular-multiplexed storage system incorporating therein a cylindrical storage medium for increasing the amount of holograms to be stored thereinto.

DESCRIPTION OF THE PRIOR ART

As is well known, demands for optically storing a large amount of data, such as a motion picture film, have been increasing. Therefore, various types of volume holographic data storage(VHDS) systems incorporating therein a storage medium have been recently developed for realizing high density optical storage capabilities, wherein the storage medium is conventionally made of lithium niobate ($LiNbO_3$) or lithium borate($Li_2B_2O_4$) and is used for three-dimensionally storing the data in the form of pages.

An angular-multiplexed storage system is most commonly used among these VHDS systems since a variation in angles can be easily obtained by rotating the storage medium or by deflecting a light beam to be used for writing or reading the data stored into the storage medium. The angular-multiplexed storage system includes a laser for generating a coherent light beam, a beam splitter, a first and a second mirrors, a detector and a storage medium in the form of rectangular hexahedron or rectangular plate. In the system, the coherent light beam from the laser enters into the beam splitter which splits the coherent light beam into a reference and a signal beams. The reference and the signal beams are reflected to the storage medium by the first and the second mirrors, respectively. Interference patterns generated by the signal and the reference beams are recorded into the storage medium. Therefore, the angular-multiplexed storage system is capable of writing and reading the data into/from the storage medium.

One way for this angular-multiplexed storage system to address the data is achieved by controlling the direction of the reference beam onto a specific region within the storage medium. This is typically done through the mechanical movement of mirrors or lenses. However, this method requires that the positions of the mirrors or the lenses for reading be precisely aligned with those for writing. Moreover, it requires a cumbersome optical device such as an acousto-optical device (AOD) for moving the mirrors or the lenses, and such an AOD is usually expensive.

Another way, known as spatial frequency multiplexing, is to rotate the storage medium about an axis perpendicular to the surface thereof, wherein the axis lies on a plane which includes the reference and the signal beams. This approach is not adaptable to the storage medium such as $LiNbO_3$ due to the anisotropy thereof.

In order to solve the problem, another type of angular-multiplexed storage system has been introduced. In the system, the storage medium is rotated about an axis perpendicular to a plane which includes the reference and the signal beams, wherein the axis passes through a central point of the storage medium.

However, there is a number of problems associated with this type of system described above. First of all, if an angle between a line normal to the surface of the storage medium and the reference beam is lager than a predetermined rotation angle, the reference beam does not transmit to the storage medium since the storage medium is in the form of a rectangular plate or rectangular hexadron and the refraction index of the storage medium is different from that of the air.

Another problem present in the system is that it is difficult to detect the data stored in the storage medium. That is, if the storage medium is rotated, the position of the detector must be adjusted while the data stored in the storage medium is being read due to the difference between the refraction index of the air and that of the storage medium, thereby resulting in a restriction on the range of angles to rotate the storage medium.

SUMMARY OF THE INVENTION

It is, therefore, a primary object of the present invention to provide an improved volume holographic storage system capable of increasing the amount of holograms to be stored into a holographic storage medium.

In accordance with the present invention, there is provided a volume holographic storage system for storing multiple holograms, the system comprising: a light source for generating a coherent light beam; a beam splitter for splitting the coherent light beam into a reference and a signal beams; a storage medium for three-dimensionally storing the multiple holograms thereinto, wherein the storage medium is in the form of a cylinder; a first mirror for directing the signal beam to the storage medium; a second mirror for reflecting the reference beam to the storage medium; a spatial light modulator for modulating the signal beam into data in the form of pages, wherein the spatial light modulator is placed between the storage medium and the first mirror; a charge coupled device for detecting a distribution of light beams such as an image in the form of pages, wherein a distance from the modulation means to the center point of the storage medium is a distance from the charge coupled device to the center point of the storage medium; and a stepping motor for rotating the storage medium about an axis perpendicular to a plane which coexists with the signal and reference beams, wherein the axis passes through the center point of the storage medium.

BRIEF DESCRIPTION OF THE DRAWINGS

The present invention together with the above and other objects and advantages will become apparent from the following description of preferred embodiments, when given in conjunction with the accompanying drawings, wherein.

DETAILED DESCRIPTION OF THE PREFERRED EMBODIMENTS

Figure 1:
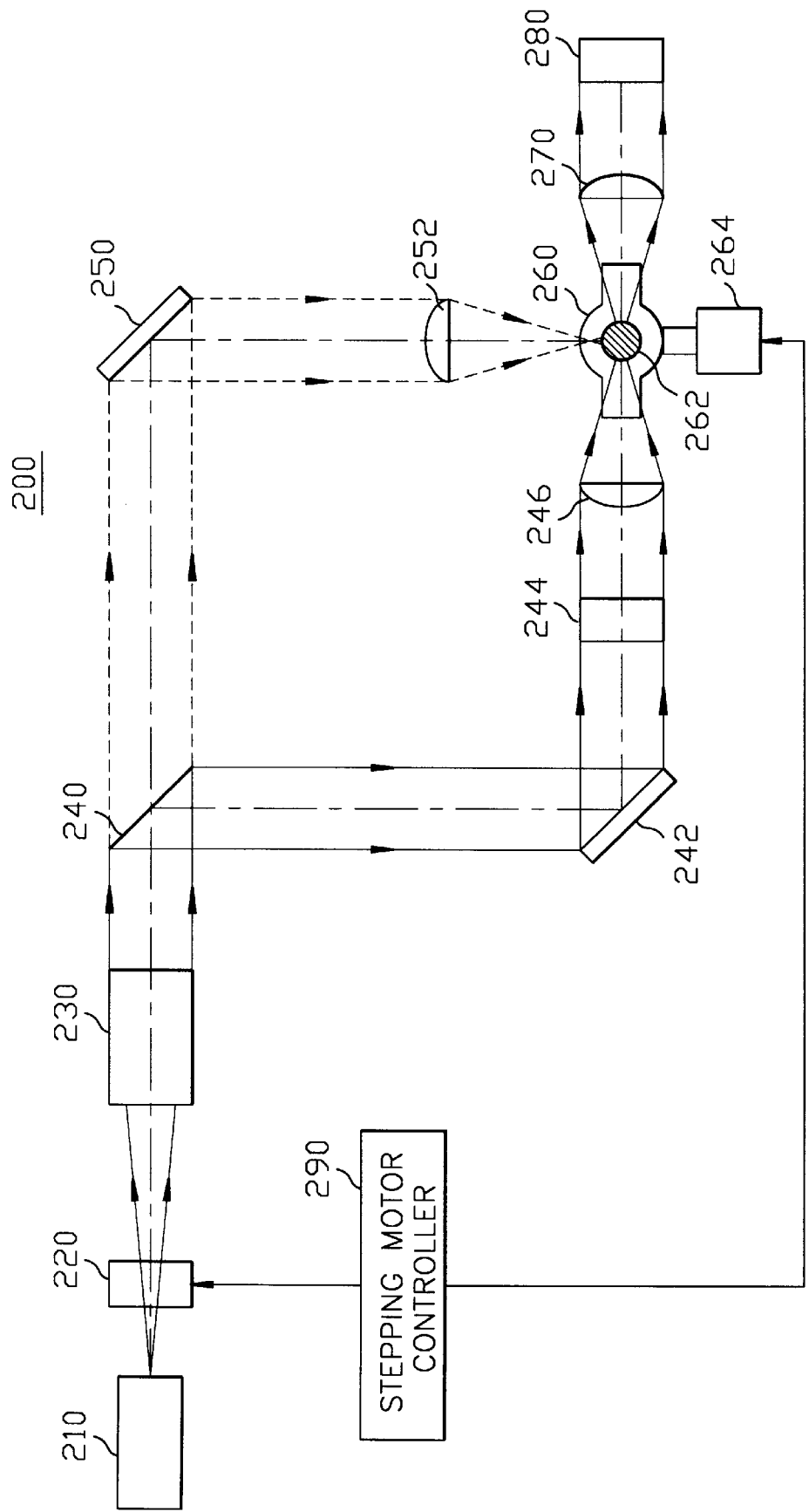
FIG. 1 represents a schematic cross-sectional view of the inventive volume holographic data storage system.

There is illustrated in FIG. 1 a schematic cross-sectional view of an inventive volume holographic data storage (VHDS) system 200 in accordance with a preferred embodiment of the present invention.

The VHDS system 200 incorporated therein the inventive cylindrical storage medium 262 comprises a light source 210 for generating a coherent light beam, a shutter 220, a beam expander 230, a beam splitter 240, a first and a second mirrors 242, 250, a spatial light modulator (SLM) 244, a first and a second cylindrical lenses 246, 270, a beam steering lens 252, a turn table 260 for mounting the cylindrical storage medium 262, a stepping motor 264, a charge coupled device (CCD) 280 and a stepping motor controller 290.

In the VHDS system 200, the coherent light beam emitted from the light source 210, e.g., a semiconductor laser, travels to the beam expander 230 via the shutter 220 which is used for controlling the exposure time of the cylindrical storage medium 262. The cylindrical storage medium 262 is made of a photorefractive crystal such as lithium niobate ($LiNbO_3$). In the preferred embodiment of the present invention, the cylindrical storage medium 262 is made of 0.03% Fe-doped lithium niobate($LiNbO_3$:Fe) crystal and is in the form of a cylinder. The beam expander 230 expands the coherent light beam passed through the shutter 220.

And then, the expanded light beam enters into the beam splitter 240 which is capable of partially reflecting the expanded light beam to thereby obtain a reference beam and a signal beam, wherein the reference beam is a portion of the expanded light beam transmitted through the beam splitter 240 and the signal beam is a remaining portion of the expanded light beam reflected from the beam splitter 240. It should be noted that in the VHDS system 200 of the present invention shown in FIGS. 1 and 2, solid and dot lines from the beam splitter 240 represent optical paths of the signal and the reference beams, respectively.

The signal beam is reflected to the SLM 244, e.g., a liquid crystal light valve, by the first mirror 242 to thereby image the signal beam onto the SLM 244. In the preferred embodiment of the present invention, the SLM 244 includes discrete modulating regions, e.g., an array of M×N modulating pixels. Each of the M×N modulating pixels is controlled by a voltage applied thereto through an integrated circuit (not shown), whereby the SLM 244 controls an amplitude and a phase of the signal beam impinged onto each of the M×N modulating pixels. Therefore, the SLM 244 is capable of converting the signal beam impinged thereonto into a modulated signal beam which contains data in the form of page after passing therethrough. The modulated signal beam is focused on a recording area 263 of the cylindrical storage medium 262 by the first cylindrical lens 246. The cylindrical storage medium 262 is arranged in such a way that a central point thereof coincides with the focal point of the first cylindrical lens 246.

On the other hand, the reference beam is reflected to the beam steering lens 252 by the second mirror 250 and focused on a point at a predetermined distance away from the cylindrical storage medium 262 by the beam steering lens 252. The predetermined distance is determined by a curvature of the cylindrical storage medium 262. In this case, the cylindrical storage medium 262 serves as a cylindrical lens of the curvature thereof, thereby making the reference beam to be parallel in the cylindrical storage medium 262.

Figure 2:
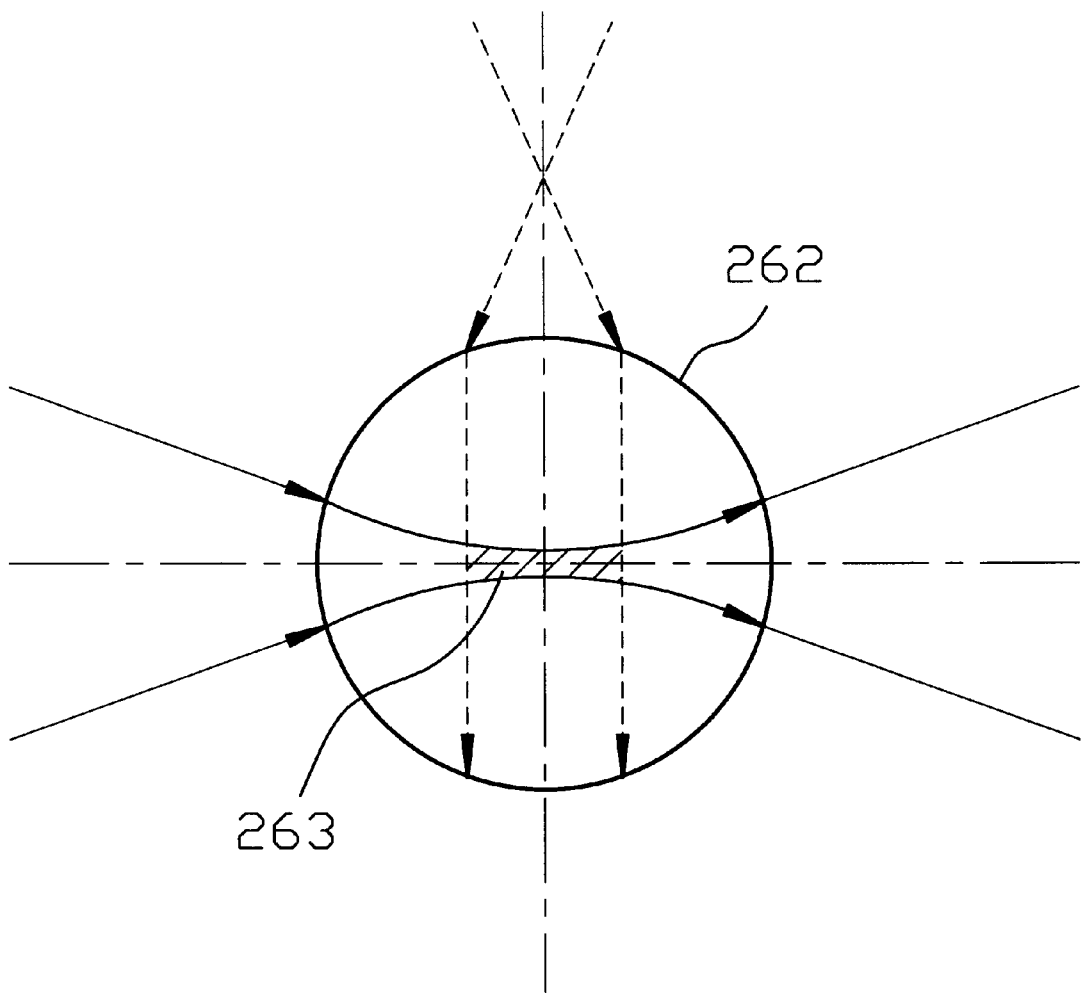
FIG. 2 presents an enlarged schematic top view of the inventive cylindrical storage medium and optical paths of a signal and a reference beams.

Referring to FIG. 2, in the cylindrical storage medium 262, the modulated signal beam interferes with the reference beam to thereby generate an interference pattern therebetween, wherein the interference pattern contains information of the modulated signal beam. The interference pattern is transferred to an optical index pattern of the recording area 263 by changing the refractive index of the cylindrical storage medium 262 in response to the interference pattern to thereby record the modulated signal beam into the recording area 263 of the cylindrical storage medium 262. The recording area 263, as represented by the shaded lines in FIG. 2 in the shape of a corn, is defined by an area which overlaps with the reference and the modulated signal beams.

Referring back to FIG. 1, the modulated signal beam transmitted through the cylindrical storage medium 262 enters into the second cylindrical lens 270, wherein the second cylindrical lens 270 makes the modulated signal beam to be parallel after passing therethrough. The modulated signal beam impinges onto the CCD 280 which is capable of detecting a distribution of light beam such as an image in the form of page. It should be noted that the distance from the SLM 244 to the first cylindrical lens 246 be identical to the distance from the second cylindrical lens 270 to the CCD 280. Further, each of the cylindrical lenses 246, 270 has a same focal point and the distance from the SLM 244 to the first cylindrical lens 246 is identical to the focal length of the first cylindrical lens 246.

If another page of data to be modulated by the SLM 244 is recorded on the recording area 263 of the cylindrical storage medium 262, the stepping motor controller 290 sends a control signal to the stepping motor 264 and the shutter 220. In response to the control signal, the shutter 220 blocks the coherent light beam and the stepping motor 264 rotates the turn table 260 in a predetermined angle about an axis perpendicular to a plane which includes the reference and the signal beams to thereby provide angle multiplexing, wherein the axis passes through the central point of the cylindrical storage medium 262 in a longitudinal direction thereof. Thereafter, the shutter 220 opens during the exposure time of the cylindrical storage medium 262. The next page of the data is modulated by the SLM 244. In the preferred embodiment of the present invention, the volume holographic storage system 200 can rotate the cylindrical storage medium 262 up to 360 degrees to the axis since the cylindrical storage medium 262 is completely symmetrical to the axis in shape and structure. Therefore, the volume holographic storage system 200 is capable of storing a large amount of pages of data into the cylindrical storage medium 262 in the form of hologram by rotating the cylindrical storage medium 262.

On the other hand, the data stored in the cylindrical storage medium 262 may be sequentially reconstructed by illuminating the cylindrical storage medium 262 with the reference beam during rotation of the cylindrical storage medium 262.

In comparison with the prior art angular-multiplexed storage system, the inventive angular-multiplexed storage system 200 is capable of recording a much larger amount of data on the storage medium. This is achieved by incorporating therein an inventive cylindrical storage medium 262 which extends the rotation angle of the cylindrical storage medium 262 up to 360 degrees.

While the present invention has been described with respect to the preferred embodiments, other modifications and variations may be made without departing from the spirit and scope of the present invention as set forth in the following claims.

What is claimed is:

1. A three-dimensional holographic storage system for storing multiple holograms, the storage system comprising:
   means for generating a coherent light beam;
   means for splitting the coherent light beam into a reference and a signal beams;
   a storage medium for three-dimensionally storing the multiple holograms thereinto, wherein the storage medium is in the form of a cylinder;
   means for directing the signal and the reference beams to the storage medium; and
   means for rotating the storage medium about an axis perpendicular to a plane which includes the signal and the reference beams, wherein the axis passes through a center point of the storage medium.

2. The storage system of claim 1, further comprising means for modulating the signal beam into data in the form of pages.

3. The storage system of claim 2, wherein the directing means includes a first and a second mirrors, the first and the second mirrors being used for reflecting the signal and the reference beams to the storage medium, respectively.

4. The storage system of claim 3, wherein the modulating means is placed between the storage medium and the first mirror.

5. The storage system of claim 4, further comprising a charge coupled device for detecting a distribution of light beams in the form of pages, wherein the distance from the modulating means to the center point of the storage medium is equal to the distance from the charge coupled device to the center point of the storage medium.

6. The storage system of claim 5, further comprising a pair of cylindrical lenses, wherein the cylindrical lenses are arranged in such a way that each of the focal points of the cylindrical lenses coincides with the center point of the storage medium.

7. The storage system of claim 6, wherein each of the cylindrical lenses has a same focal length.

8. The storage system of claim 7, wherein the distance from the charge coupled device to the cylindrical lens is equal to the focal length, the cylindrical lens being disposed between the charge coupled device and the storage medium.

9. The storage system of claim 4, further comprising a beam steering lens, wherein the storage medium is placed at a predetermined distance away from a focal point of the beam steering lens.

10. The storage system of claim 6, wherein the storage medium serves as a cylindrical lens to thereby make the reference beam parallel in the storage medium.

11. The storage system of claim 1, further comprising a shutter for controlling an exposure time of the storage medium.

12. The storage system of claim 1, further comprising a beam expander for expanding the coherent light beam passing through the shutter, wherein the beam expander is disposed between the coherent light beam generating means and the beam expander.

13. The storage system of claim 1, wherein the storage medium is made of a 0.03% Fe-doped lithium niobate ($LiNbO_3$:Fe) crystal.

* * * * *